(12) United States Patent
Kobayashi

(10) Patent No.: US 11,048,511 B2
(45) Date of Patent: Jun. 29, 2021

(54) DATA PROCESSING DEVICE DATA PROCESSING METHOD AND RECORDING MEDIUM

(71) Applicant: NEC Corporation, Tokyo (JP)

(72) Inventor: Yuki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/762,317

(22) PCT Filed: Nov. 9, 2018

(86) PCT No.: PCT/JP2018/041574
§ 371 (c)(1),
(2) Date: May 7, 2020

(87) PCT Pub. No.: WO2019/093451
PCT Pub. Date: May 16, 2019

(65) Prior Publication Data
US 2020/0293317 A1    Sep. 17, 2020

(30) Foreign Application Priority Data
Nov. 13, 2017 (JP) .............................. JP2017-218089

(51) Int. Cl.
*G06F 9/30* (2018.01)
*G06F 9/32* (2018.01)

(52) U.S. Cl.
CPC ...... *G06F 9/30065* (2013.01); *G06F 9/30029* (2013.01); *G06F 9/30072* (2013.01);
(Continued)

(58) Field of Classification Search
None
See application file for complete search history.

(56) References Cited

U.S. PATENT DOCUMENTS

| 4,974,663 A | 12/1990 | Nakaji |
| 5,579,493 A | 11/1996 | Kiuchi et al. |

(Continued)

FOREIGN PATENT DOCUMENTS

| JP | S58-127245 A | 7/1983 |
| JP | S61-8451 A | 1/1986 |

(Continued)

OTHER PUBLICATIONS

International Search Report for PCT Application No. PCT/JP2018/041574, dated Feb. 12, 2019.
(Continued)

*Primary Examiner* — Corey S Faherty
(74) *Attorney, Agent, or Firm* — Sughrue Mion, PLLC

(57) ABSTRACT

A data processing device according to the present invention includes: a loop counter group that includes a loop-control register set; a loop controller that controls the loop counter group, based on a value of the loop counter group, and generates a loop end signal; a controller that controls the loop counter group and the loop controller, based on an instruction word taken from an instruction memory and the loop end signal, and generates a calculator control signal and a program-counter control signal; a calculator that executes a calculation, based on the calculator control signal; and a program counter that performs a count operation in response to the program-counter control signal, and stores an address of the instruction memory storing an instruction word to be executed next.

5 Claims, 10 Drawing Sheets

(52) U.S. Cl.
CPC ...... *G06F 9/30101* (2013.01); *G06F 9/30145* (2013.01); *G06F 9/321* (2013.01)

(56) References Cited

U.S. PATENT DOCUMENTS

| | | | | |
|---|---|---|---|---|
| 5,802,375 | A * | 9/1998 | Ngo | G06F 8/452 |
| | | | | 717/150 |
| 10,241,793 | B2 * | 3/2019 | Perkins | G06F 9/3887 |
| 2002/0083305 | A1 * | 6/2002 | Renard | G06F 9/325 |
| | | | | 712/220 |
| 2014/0188961 | A1 * | 7/2014 | Plotnikov | G06F 9/3455 |
| | | | | 708/201 |
| 2019/0310851 | A1 * | 10/2019 | Grocutt | G06F 9/3818 |

FOREIGN PATENT DOCUMENTS

| | | |
|---|---|---|
| JP | S62-32506 A | 2/1987 |
| JP | S63-53644 A | 3/1988 |
| JP | S63-59174 A | 3/1988 |
| JP | H02-14730 A | 1/1990 |
| JP | H02-14730 B2 | 4/1990 |
| JP | H07-160585 A | 6/1995 |
| JP | 2000-276351 A | 10/2000 |
| JP | 2002-304293 A | 10/2002 |
| JP | 2004-021890 A | 1/2004 |
| JP | 2005-352755 A | 12/2005 |
| JP | 2010-016830 A | 1/2010 |
| JP | 2010-277124 A | 12/2010 |

OTHER PUBLICATIONS

English translation of Written opinion for PCT Application No. PCT/JP2018/041574, dated Feb. 12, 2019.

* cited by examiner

Fig. 4B

| opc | NIMONIC | OPERATION | REMARKS |
|---|---|---|---|
| 0000 | NOP | (no operation) | No Operation |
| 0001 | ADD | RF[rd] ← RF[rs] + RF[rt] | Add |
| 0010 | MVI | RF[rd] ← imm | Move Immediate |
| 0011 | SETLP | LOOP COUNTER GROUP[rd] ← imm | Set Loop Counters |
| 0100 | MAC | m[rd+LCNT_B+LCNT_C*(LMAX_B+LSTEP_B)] ← m[rs+LCNT_A+LCNT_C*(LMAX_A+LSTEP_A)] *m[rt+LCNT_B+LCNT_A*(LMAX_B+LSTEP_B)] + m[rd+LCNT_B+LCNT_C*(LMAX_B+LSTEP_B)] | Multiply & Accumulate |
| 0101 | CMP | FG ← flag(RF[rs] - RF[rt]) | Compare |
| 1000 | BRLT | if (FG [sign] == 1) PC ← PC + imm | Branch Less than |
| 1001 | BRNEST | if ((LCNT_A<LMAX_A)∥(LCNT_B<LMAX_B) ∥(LCNT_C<LMAX_C)) { PC ← PC + imm } LCNT_A ← (LMAX_A<LMAX_A)?(LCNT_A+LSTEP_A):0; LCNT_B ← (LCNT_A<LMAX_A)?LCNT_B: (LCNT_B<LMAX_B)?(LCNT_B+LSTEP_B):0; LCNT_C ← (LCNT_A<LMAX_A)?LCNT_C: (LCNT_B<LMAX_B)?LCNT_C: (LCNT_C<LMAX_C)?(LCNT_C+LSTEP_C):0; | Branch for Nested Loop |

Fig. 5

```
1   SETLP LMAX_C, 3
2   SETLP LMAX_B, 1
3   SETLP LMAX_A, 1
4   SETLP LCNT_C, 0
5   SETLP LCNT_B, 0
6   SETLP LCNT_A, 0
7   SETLP LSTEP_C, 1
8   SETLP LSTEP_B, 1
9   SETLP LSTEP_A, 1
10 LX: MAC 0x00, 0x20, 0x40
11  BRNEST LX
12
13
14
15
16
17
18
19
20
21
22
```

Fig. 6

| # Iteration | LCNT_C | LCNT_B | LCNT_A | BRANCH |
|---|---|---|---|---|
| 1 | 0 | 0 | 0 | Yes |
| 2 | 0 | 0 | 1 | Yes |
| 3 | 0 | 0 | 2 | Yes |
| 4 | 0 | 0 | 3 | Yes |
| 5 | 0 | 1 | 0 | Yes |
| 6 | 0 | 1 | 1 | Yes |
| 7 | 0 | 1 | 2 | Yes |
| 8 | 0 | 1 | 3 | Yes |
| 9 | 1 | 0 | 0 | Yes |
| 10 | 1 | 0 | 1 | Yes |
| | ... | ... | ... | |
| 15 | 1 | 1 | 2 | Yes |
| 16 | 1 | 1 | 3 | No |
| END | 0 | 0 | 0 | — |

| # Iteration | LCNT_C | LCNT_B | LCNT_A | OPERATION OF MAC INSTRUCTION |
|---|---|---|---|---|
| 1 | 0 | 0 | 0 | m[0×40+0+0*2]+=m[0×0+0+0*4]*m[0×20+0+0*2] |
| 2 | 0 | 0 | 1 | m[0×40+0+0*2]+=m[0×0+1+0*4]*m[0×20+0+1*2] |
| 3 | 0 | 0 | 2 | m[0×40+0+0*2]+=m[0×0+2+0*4]*m[0×20+0+2*2] |
| 4 | 0 | 0 | 3 | m[0×40+0+0*2]+=m[0×0+3+0*4]*m[0×20+0+3*2] |
| 5 | 0 | 1 | 0 | m[0×40+1+0*2]+=m[0×0+0+0*4]*m[0×20+1+0*2] |
| 6 | 0 | 1 | 1 | m[0×40+1+0*2]+=m[0×0+1+0*4]*m[0×20+1+1*2] |
| 7 | 0 | 1 | 2 | m[0×40+1+0*2]+=m[0×0+2+0*4]*m[0×20+1+2*2] |
| 8 | 0 | 1 | 3 | m[0×40+1+0*2]+=m[0×0+3+0*4]*m[0×20+1+3*2] |
| 9 | 1 | 0 | 0 | m[0×40+0+1*2]+=m[0×0+0+1*4]*m[0×20+0+0*2] |
| 10 | 1 | 0 | 1 | m[0×40+0+1*2]+=m[0×0+1+1*4]*m[0×20+0+1*2] |
| | ... | ... | ... | |
| 15 | 1 | 1 | 2 | m[0×40+1+1*2]+=m[0×0+2+1*4]*m[0×20+0+2*2] |
| 16 | 1 | 1 | 3 | m[0×40+1+1*2]+=m[0×0+3+1*4]*m[0×20+0+3*2] |

| opc | NIMONIC | OPERATION | REMARKS |
|---|---|---|---|
| 0100 | MAC | m[rd+LCNT_B+LCNT_C*(LMAX_B+LSTEP_B)] ← m[rs+LCNT_A+LCNT_C*(LMAX_A+LSTEP_A)] * m[rt+LCNT_B+LCNT_A*(LMAX_B+LSTEP_B)] + m[rd+LCNT_B+LCNT_C*(LMAX_B+LSTEP_B)]; if ( af==1) ( if (nestcond()) PC ← PC + imm ) | Multiply & Accumulate |
|  |  | (OTHER INSTRUCTIONS ARE OMITTED) |  |

Fig. 10

```
1       SETLP LMAX_C, 3
2       SETLP LMAX_B, 1
3       SETLP LMAX_A, 1
4       SETLP LCNT_C, 0
5       SETLP LCNT_B, 0
6       SETLP LCNT_A, 0
7       SETLP LSTEP_C, 1
8       SETLP LSTEP_B, 1
9       SETLP LSTEP_A, 1
10  LX: MAC   0x00, 0x20, 0x40, LX, 1
11
12
13
14
15
16
17
18
19
20
21
22
```

Fig. 11

```
m = 40 // NUMBER OF ROWS OF matA
n = 20 // NUMBER OF COLUMNS OF matB
k = 16 // NUMBER OF COLUMNS OF matA, NUMBER OF ROWS OF matB
for (mm = 0; mm < m; mm++) {
    for (nn = 0; nn < n; nn++) {
        float tmp = 0.0f ;
        for ( kk = 0; kk < k; kk ++) {
            tmp += matA[ mm * iA + kk ] * matB[ kk * iB + nn ];
        }
        matC [mm * iC + nn ] = tmp ;
    }
}
```

Fig. 12

| | | |
|---|---|---|
| 1 | MVI | R3, 40 |
| 2 | MVI | R2, 20 |
| 3 | MVI | R1, 16 |
| 4 | MVI | R6, 0 |
| 5 | MVI | R9, 0x400 |
| 6 | L3: MVI | R5, 0 |
| 7 | MVI | R8, 0x200 |
| 8 | L2: MVI | R4, 0 |
| 9 | MVI | R7, 0x000 |
| 10 | L1: MAC | R7, R8, R9 |
| 11 | ADD | R7, 1, R7 |
| 12 | ADD | R4, 1, R4 |
| 13 | CMP | R4, R1 |
| 14 | BRLT | L1 |
| 15 | ADD | R8, 1, R8 |
| 16 | ADD | R5, 1, R5 |
| 17 | CMP | R5, R2 |
| 18 | BRLT | L2 |
| 19 | ADD | R9, 1, R9 |
| 20 | ADD | R6, 1, R6 |
| 21 | CMP | R6, R3 |
| 22 | BRLT | L3 | ns
DATA PROCESSING DEVICE DATA PROCESSING METHOD AND RECORDING MEDIUM

This application is a National Stage Entry of PCT/JP2018/041574 filed on Nov. 9, 2018, which claims priority from Japanese Patent Application 2017-218089 filed on Nov. 13, 2017, the contents of all of which are incorporated herein by reference, in their entirety.

TECHNICAL FIELD

The present invention relates to a data processing device, a loop control device, and the like, and particularly, relates to a data processing device, a loop control device, and the like for iteratively executing a calculation of a matrix product or the like for a large matrix.

BACKGROUND ART

In an application for analytic processing, signal processing, or the like of big data, a calculation of a matrix product or the like for a large matrix frequently occurs.

In such an application, a multi-loop is often used. For example, a program of a matrix product is described with a triple loop as illustrated in FIG. 11. Herein, matA and matB each represent a matrix of input, matC represents a matrix of output, and iA, iB, and iC each represent width of one row of each of matA, matB, and matC.

In such an application, execution time of a multi-loop over execution time of the whole application is often predominant. Typically, it is said that 5% of the total instruction sequence accounts for 95% of execution time. In this instance, if a loop can be shortened even one cycle, this leads to a great performance improvement. For example, it is assumed that a loop including a 9-cycle instruction sequence accounts for 95% of total execution time. In this case, the total execution time can be reduced by approximately 10% only by shortening the instruction sequence one cycle from 9 cycles to 8 cycles.

FIG. 12 is a diagram illustrating an assembly program example of a matrix product program. Herein, each row includes a label, an instruction name, and an operand group.

An MVI instruction is an immediate assignment instruction to assign an immediate of a second operand to a register of a first operand. An MAC instruction is a sum-of-products instruction to multiply data of an address stored in a register of a first operand by data of an address stored in a register of a second operand, and accumulate a product being a result of the multiplication on data of an address stored in a register of a third operand. An ADD instruction is an addition instruction to add a register value of a first operand and an immediate of a second operand, and then store a result of the addition in a register of a third operand. A CMP instruction is a comparison instruction to compare a register value of a first operand with a register value of a second operand, and then store a result of the comparison in a flag register or the like. A BRLT instruction is a branch instruction to refer to a comparison result stored in a flag register or the like, and jump to a label specified by a first operand of the BRLT instruction when a first operand of a previously executed comparison instruction is less than a second operand.

Herein, it is seen that a large number of instructions are used for control of a loop, such as an addition instruction of a loop variable, a comparison instruction for end determination of a loop, and a branch instruction. For example, addition instructions on 12th, 16th, and 20th lines, comparison instructions on 13th, 17th, and 21st lines, and branch instructions on 14th, 18th, and 22nd lines are each equivalent to an instruction used for control of a loop. Hereinafter, these instructions are each referred to as a "loop control instruction".

It is also seen that an instruction for initializing registers (R7 to R9) that store an address variable of target data for a sum-of-products calculation exists at a top of each layer of a loop. For example, immediate assignment instructions on 4th, 6th, and 8th lines are each equivalent to an instruction used for initialization. It is seen that an addition instruction for updating each of the registers R7 to R9 exists near a termination of each layer of a loop. For example, addition instructions on 11th, 15th, and 19th lines are each equivalent to such an addition instruction for updating. Hereinafter, these instructions are each referred to as an "address update instruction".

Thus, in order to reduce execution time of an application, it is necessary to reduce loop control instructions and address update instructions, and decrease the number of instruction constituting a multi-loop as much as possible.

Note that it is obvious to those of ordinary skill in the art that the number of instructions can be reduced by convertibly using a register to store a loop variable and an address variable. For example, in the example of FIG. 12, three immediate assignment instructions on the 4th, 6th, and 8th lines can be reduced by convertibly using registers R1 to R3 and the registers R7 to R9. However, it has not yet been possible to completely eliminate loop control instructions and address update instructions.

Various systems related to the present invention are known.

Patent Literature (PTL) 1 discloses, as a technique of reducing loop control instructions, a technique that achieves a loop variable as a dedicated counter, and perform automatic control of the counter. PTL 1 also discloses a technique that also adapts to a multi-loop by storing, on a stack, an address representing a top instruction of a loop.

PTL 2 discloses a technique of reducing power by use of a repeat instruction and an instruction buffer even in a multi-loop.

PTL 3 discloses a technique of performing loop register update and lightening end determination. In PTL 3, a program counter PC is controlled by providing an iteration flag for instructing on iteration processing, providing, in an instruction register, a field indicating a final instruction for an iteration loop, updating a loop control register by activation of a field, and comparing with a final value by activation of an iteration flag. PTL 3 also adapts to a multi-loop by providing a dedicated stack in the iteration flag. Further, in PTL 3, initial setting before entering a loop, update of the loop control register in a loop, and loop end determination are performed for loop control of iteration processing by use of a general-purpose register.

PTL 4 discloses a technique of performing, in parallel, determination of calculation and iterative execution of a program. In PTL 4, indicating an instruction for a branch destination by use of a stack leads to a short instruction word length, and also enables multiple iteration processing.

PTL 5 discloses a technique of executing a loop by use of a register that stores a top address of a loop, and a register that stores a loop size. PTL 5 can also adapt to a multi-loop by evacuating to a stack.

PTL 6 discloses a technique of using a hardware loop instruction that achieves high speed by reducing an off-chip memory access. In PTL 6, a block of an instruction can be iteratively executed.

PTL 7 discloses a technique of acting for a function of a loop instruction (BCT) by a counting branch bypass register.

PTL 8 discloses a technique of providing a field for specifying, in a microprogram, determination of loop escape condition satisfaction and update of a loop count register, in order to reduce the number of processing steps, when a condition branch instruction is included in a loop.

PTL 9 discloses a calculation method of calculating a multi-radix butterfly used in a discrete Fourier transform (DFT) calculation. PTL 9 discloses a method of performing, in parallel, end determination of loops on a plurality of layers. PTL 9 illustrates, in FIG. 9 thereof, one example of an accumulator used in an address generator. A loop is implemented by using a counter that stores the number of iterations. When a maximum number of iterations is set in each counter, a counter in an innermost loop starts counting. When reaching a final iteration, this counter increments a counter in an outer loop, and resets itself. There comes an end when all counters reach a final iteration.

PTL 10 discloses a data processing device that eliminates complexity of an instruction fetching and decoding circuit for parallel data, keeps down power consumption, and yet efficiently performs parallel processing, by adopting a horizontal microcode. The horizontal microcode includes an instruction field, a cycle flag field, and a loop counter selection field. The number of loop times is controlled by the loop counter selection field. The data processing device disclosed in PTL 10 can adapt to a nested structure only by specifying a different loop counter, and then controlling the number of loop times. The data processing device disclosed in PTL 10 can also execute up to a triple nested structure with general-purpose control similar to that of single-loop processing.

CITATION LIST

Patent Literature

[PTL 1] Japanese Examined Patent Publication No. S61-008451
[PTL 2] Japanese Unexamined Patent Application Publication No. H07-160585
[PTL 3] Japanese Examined Patent Publication No. H02-014730
[PTL 4] Japanese Examined Patent Publication No. S63-059174
[PTL 5] Japanese Unexamined Patent Application Publication No. S63-053644
[PTL 6] Japanese Unexamined Patent Application Publication No. 2000-276351
[PTL 7] Japanese Examined Patent Publication No. S62-032506
[PTL 8] Japanese Unexamined Patent Application Publication No. S58-127245
[PTL 9] Japanese Unexamined Patent Application Publication No. 2010-016830
[PTL 10] Japanese Unexamined Patent Application Publication No. 2004-021890

SUMMARY OF INVENTION

Technical Problem

However, PTLs 1 to 10 described above each have an issue as described below.

PTL 1 is not able to achieve escape from a multi-loop in one cycle.

PTL 2 needs to evacuate a state of each register for repeat control to a stack, and is not able to achieve escape from a multi-loop in one cycle.

PTL 3 uses a stack, therefore, is not able to simultaneously perform end determination of loops on a plurality of layers, and requires a plurality of cycles for escape from a multi-loop.

PTL 4 adapts to a multi-loop, but is not able to perform end determination in one cycle.

PTL 5 is not able to perform end determination in one cycle.

PTL 6 has no description relating to a multi-loop, and is not able to reduce branch instructions.

PTL 7 does not adapt to a multi-loop. PTL 7 is a technique relating to a hardware loop, is not able to be achieved within a normal branch instruction, and needs large-scale addition to a control circuit.

PTL 8 does not adapt to a multi-loop.

PTL 9 only discloses a calculation method dedicated to a fast-Fourier-transform (FFT) calculation circuit, and does not disclose a configuration method of a branch instruction that can perform, for an instruction set processor, simultaneous end determination for a plurality of layers in a form having a high affinity to another instruction.

PTL 10 only discloses that a loop counter selection field for controlling the number of loop times is simply included in a horizontal microcode. PTL 10 does not perform simultaneous end determination on a plurality of layers either.

Thus, the techniques disclosed in PTLs 1 to 10 each have an issue of being not able to simultaneously perform loop end determination on a plurality of layers in a multi-loop.

An object of the present invention is to provide a data processing device, a loop control device, and the like that can solve the issue described above.

Solution to Problem

A data processing device in one aspect of the present invention includes: a loop counter group that includes a loop-control register set; a loop controller that controls the loop counter group, based on a value of the loop counter group, and generates a loop end signal; a control unit a controller that controls the loop counter group and the loop controller, based on an instruction word taken from an instruction memory and the loop end signal, and generates a calculator control signal and a program-counter control signal; a calculator that executes a calculation, based on the calculator control signal; and a program counter that performs a count operation in response to the program-counter control signal, and stores an address of the instruction memory storing an instruction word to be executed next, wherein the loop counter group includes, for first to N-th (N is an integer of 2 or more) layers of a multi-loop, as the loop-control register set, first to N-th loop counters, first to N-th loop-count-maximum-value registers, and first to N-th loop-variable-increment registers, the loop controller performs determination of a loop end by comparing an n-th (1≤n≤N) loop counter value of an n-th loop counter within the loop-control register set with an n-th loop-count maximum value of an n-th loop-count-maximum-value register in such a way as to perform loop control of the multi-loop, performs zero reset of the n-th loop counter in a case of a loop end, and, in a case of not being a loop end, causes the n-th loop counter to store, as an n-th update value being a new n-th loop counter value, an n-th additional value acquired by adding an n-th loop-variable increment value of an n-th loop-variable-increment register to the n-th loop counter value, the loop controller simultaneously performs loop end determination and loop counter update for the first to N-th loop counters being associated with the first to N-th layers, respectively, and the controller generates the calculator control signal associated with the multi-loop by causing each of first to N-th counter values of the first to N-th loop counters to act on an associated field of the instruction word, and then outputs the calculator control signal to the calculator.

A loop control device in one aspect of the present invention includes: a loop counter group that includes a loop-control register set; and a loop controller that controls the loop counter group, based on a value of the loop counter group, and generates a loop end signal, wherein the loop counter group includes, for first to N-th (N is an integer of 2 or more) layers of a multi-loop, as the loop-control register set, first to N-th loop counters, first to N-th loop-count-maximum-value registers, and first to N-th loop-variable-increment registers, the loop controller performs determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, performs zero reset of the n-th loop counter in a case of a loop end, and, in a case of not being a loop end, causes the n-th loop counter to store, as an n-th update value being a new n-th loop counter value, an n-th additional value acquired by adding an n-th loop-variable increment value of an n-th loop-variable-increment register to the n-th loop counter value, and the loop controller simultaneously performs loop end determination and loop counter update for the first to N-th loop counters being associated with the first to N-th layers, respectively.

A data processing method in one aspect of the present invention, in a data processing device including a loop counter group that includes a loop-control register set, a loop controller that controls the loop counter group, based on a value of the loop counter group, and generates a loop end signal, a controller that controls the loop counter group and the loop controller, based on an instruction word taken from an instruction memory and the loop end signal, and generates a calculator control signal and a program-counter control signal, a calculator that executes a calculation, based on the calculator control signal, and a program counter that performs a count operation in response to the program-counter control signal, and stores an address of the instruction memory storing an instruction word to be executed next, the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the data processing method including: by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, performing zero reset of the n-th loop counter in a case of a loop end, and, in a case of not being a loop end, causing the n-th loop counter to store, as an n-th update value being a new n-th loop counter value, an n-th additional value acquired by adding an n-th loop-variable increment value of an n-th loop-variable-increment register to the n-th loop counter value; by the loop controller, simultaneously performing loop end determination and loop counter update for the first to N-th loop counters being associated with the first to N-th layers, respectively; and by the controller, generating the calculator control signal associated with the multi-loop by causing each of first to N-th counter values of the first to N-th loop counters to act on an associated field of the instruction word, and then outputting the calculator control signal to the calculator.

A loop control method in one aspect of the present invention, in a loop control device including a loop counter group that includes a loop-control register set, and a loop controller that controls the loop counter group, based on a value of the loop counter group, and generates a loop end signal, the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the loop control method including: by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, performing zero reset of the n-th loop counter in a case of a loop end, and, in a case of not being a loop end, causing the n-th loop counter to store, as an n-th update value being a new n-th loop counter value, an n-th additional value acquired by adding an n-th loop-variable increment value of an n-th loop-variable-increment register to the n-th loop counter value; and by the loop controller, simultaneously performing loop end determination and loop counter update for the first to N-th loop counters being associated with the first to N-th layers, respectively.

A non-transitory computer-readable recording medium in one aspect of the present invention, embodying a program, the program causing a data processing device to perform a method, in the data processing device including a loop counter group that includes a loop-control register set, a loop controller that controls the loop counter group, based on a value of the loop counter group, and generates a loop end signal, a controller that controls the loop counter group and the loop controller, based on an instruction word taken from an instruction memory and the loop end signal, and generates a calculator control signal and a program-counter control signal, a calculator that executes a calculation, based on the calculator control signal, and a program counter that performs a count operation in response to the program-counter control signal, and stores an address of the instruction memory storing an instruction word to be executed next, the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the method comprising: by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, processing of performing zero reset of the n-th loop counter in a case of a loop end, and processing of, in a case of not being a loop end, causing the n-th loop counter to store, as an n-th update value being a new n-th loop counter value, an n-th additional value acquired by adding an n-th loop-variable increment value of an n-th loop-variable-increment register to the n-th loop counter value; by the loop controller simultaneously performing loop end determination and loop counter update for the first to N-th loop counters being associated with the first to N-th layers, respectively; and by the controller, generating the calculator control signal associated with the multi-loop by causing each of first to N-th counter values of the first to N-th loop counters to act on an associated field of the instruction word, and then outputting the calculator control signal to the calculator.

A non-transitory computer-readable recording medium in one aspect of the present invention, embodying a program, the program causing a data processing device to perform a method, in the loop control device including a loop counter group that includes a loop-control register set, and a loop controller that controls the loop counter group, based on a value of the loop counter group, and generates a loop end signal, the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the method including by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, processing of performing zero reset of the n-th loop counter in a case of a loop end, and processing of, in a case of not being a loop end; causing the n-th loop counter to store, as an n-th update value being a new n-th loop counter value, an n-th additional value acquired by adding an n-th loop-variable increment value of an n-th loop-variable-increment register to the n-th loop counter value; and by the loop controller, simultaneously performing loop end determination and loop counter update for the first to N-th loop counters being associated with the first to N-th layers, respectively.

Advantageous Effects of Invention

According to the present invention, it is possible to reduce loop control instructions in a multi-loop, and reduce address update instructions in a multi-loop.

BRIEF DESCRIPTION OF DRAWINGS

FIG. 4B is a diagram illustrating an operation of an instruction word used in the data processing device illustrated in FIG. 1.

FIG. 5 is a diagram illustrating an assembly program example when a matrix product is executed by use of the data processing device illustrated in FIG. 1.

FIG. 6 is a diagram illustrating an example of transition of first to third loop counter values LCNT_A to LCNT_C.

FIG. 10 is a diagram illustrating an assembly program example when a matrix product in the second example embodiment is executed.

FIG. 11 is a diagram illustrating one example of a program of a matrix product described in a triple loop.

FIG. 12 is a diagram illustrating an assembly program example of a matrix product program.

EXAMPLE EMBODIMENT

Next, embodiments of the invention will be described in detail with reference to the drawings.

First Example Embodiment

[Description of Configuration]

Figure 1:
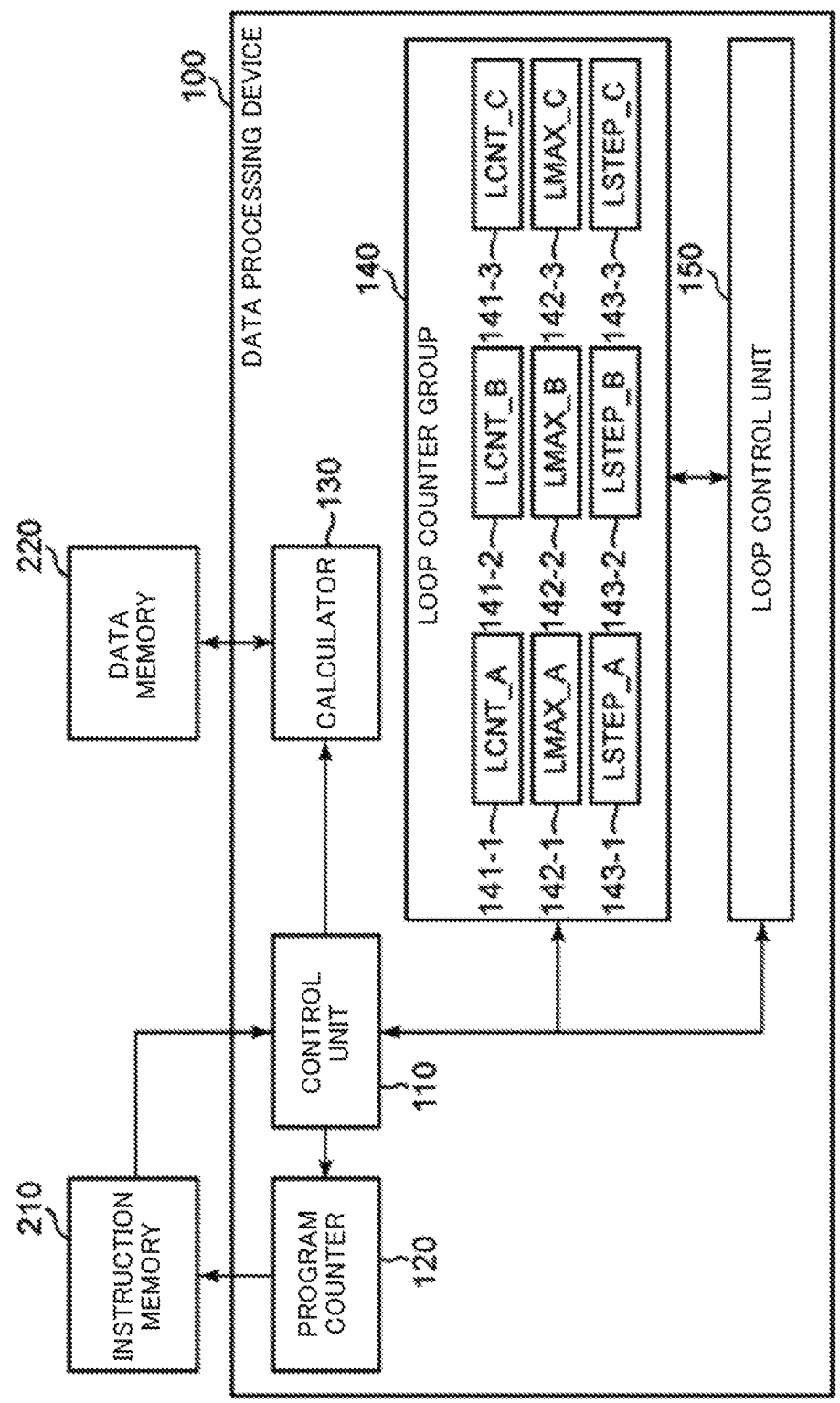
FIG. 1 is a block diagram illustrating a configuration of a data processing device according to a first example embodiment of the present invention.

Referring to FIG. 1, a data processing device 100 according to a first example embodiment of the present invention includes a control unit 110, a program counter 120, a calculator 130, a loop counter group 140, and a loop control unit 150.

The control unit 110 and the program counter 120 are connected to an instruction memory 210. The calculator 130 is connected to a data memory 220.

The loop counter group 140 includes first to third loop counters 141-1, 141-2, and 141-3, first to third loop-count-maximum-value registers 142-1, 142-2, and 142-3, and first to third loop step registers 143-1, 143-2, 143-3. The first to third loop counters 141-1 to 141-3 store first to third loop counter values LCNT_A to LCNT_C representing loop variables, respectively. The first to third loop-count-maximum-value registers 142-1 to 142-3 store first to third loop-count maximum values LMAX_A to LMAX_C representing the numbers of loop times, respectively. The first to third loop step registers 143-1 to 143-3 store first to third loop-variable increment values LSTEP_A to LSTEP_C representing loop variable increments, respectively. Note that each of the loop step registers 143-1 to 143-3 is also called a loop-variable-increment register.

Note that a case where the loop counter group 140 can adapt to up to a triple loop by having three loop counters, three loop-count-maximum-value registers, and three loop step registers is illustrated herein by way of example, but it goes without saying that the present example embodiment does not need to be limited thereto. Generally, the loop counter group 140 may have N (N is an integer of 2 or more) loop counters, N loop-count-maximum-value registers, and N loop step registers. For example, the loop counter group 140 may adapt to up to a quintuple loop by having five loop counters, five loop-count-maximum-value registers, and five loop step registers. Note that the loop counter group 140 may save a circuit area instead of not adapting to a multi-loop, by having one loop counter, one loop-count-maximum-value register, and one loop step register.

Figure 2:
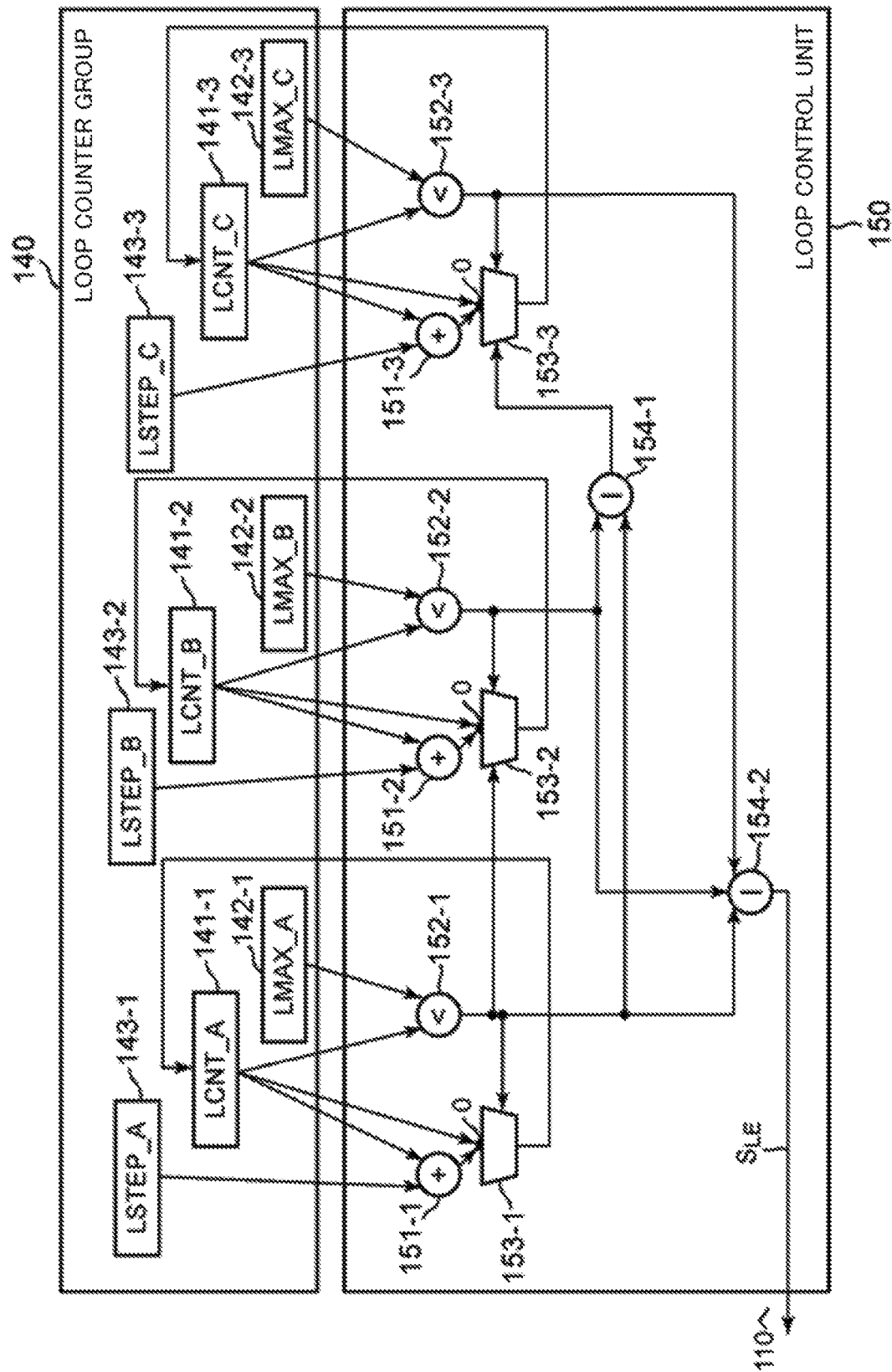
FIG. 2 is a block diagram illustrating configurations of a loop control unit and a loop counter group used in the data processing device illustrated in FIG. 1.

FIG. 2 is a block diagram illustrating a configuration of the loop control unit 150 and a configuration of the loop counter group 140.

The loop control unit 150 includes first to third adders 151-1, 151-2, and 151-3, first to third comparators 152-1, 152-2, and 152-3, first to third multiplexers 153-1, 153-2, and 153-3, first and second OR gates 154-1 and 154-2.

The first adder 151-1 outputs a first additional value by adding (deriving a sum of) the first loop counter value LCNT_A and the first loop-variable increment value LSTEP_A. The first comparator 152-1 performs a magnitude comparison between the first loop counter value LCNT_A and the first loop-count maximum value LMAX_A, and outputs a first comparison result. The first multiplexer 153-1 selects, based on the first comparison result, a first update value of the first loop counter 141-1 from either the first additional value, or the zero or current first loop counter value LCNT_A.

Similarly, the second adder 151-2 outputs a second additional value by adding (deriving a sum of) the second loop counter value LCNT_B and the second loop-variable increment value LSTEP_B. The second comparator 152-2 performs a magnitude comparison between the second loop counter value LCNT_B and the second loop-count maximum value LMAX_B, and outputs a second comparison result. The second multiplexer 153-2 selects, based on the first and second comparison results, a second update value of the second loop counter 141-2 from either the second additional value, or the zero or current second loop counter value LCNT_B.

Similarly, the third adder 151-3 outputs a third additional value by adding (deriving a sum of) the third loop counter value LCNT_C and the third loop-variable increment value LSTEP_C. The third comparator 152-3 performs a magnitude comparison between the third loop counter value LCNT_C and the third loop-count maximum value LMAX_C, and outputs a third comparison result. The third multiplexer 153-3 selects, based on the first to third comparison results, a third update value of the third loop counter 141-3 from either the third additional value, or the zero or current third loop counter value LCNT_C.

The first OR gate 154-1 outputs a first OR result by deriving an OR of the first comparison result and the second comparison result. The first OR result is supplied to the third comparator 152-3. The second OR gate 154-2 outputs a second OR result by deriving an OR of the first comparison result, the second comparison result, and the third comparison result. The second OR result is supplied to the control unit 110 as a loop end signal $S_{LE}$. Therefore, a combination of the first OR gate 154-1 and the second OR gate 154-2 serve as an OR gate group that derives an OR of the first to third comparison results, and outputs at least the loop end signal $S_{LE}$.

When LCNT_A<LMAX_A, the first comparator 152-1 outputs a first comparison result at a logic "1" level. Otherwise, the first comparator 152-1 outputs a first comparison result at a logic "0" level. When the first comparison result is at a logic "1" level, the first multiplexer 153-1 selects the first additional value as the first update value. When the first comparison result is at a logic "0" level, the first multiplexer 153-1 outputs zero as the first update value.

When LCNT_B<LMAX_B, the second comparator 152-2 outputs a second comparison result at a logic "1" level. Otherwise, the second comparator 152-2 outputs a second comparison result at a logic "0" level. When the first comparison result is at a logic "1" level, the second multiplexer 153-2 selects the current second loop counter value LCNT_B as the second update value. When the second comparison result is at a logic "1" level, the second multiplexer 153-2 selects the second additional value as the second update value. Otherwise, i.e., when both the first and second comparison results are at a logic "0" level, the second multiplexer 153-2 outputs zero as the second update value.

When LCNT_C<LMAX_C, the third comparator 152-3 outputs a third comparison result at a logic "1" level. Otherwise, the third comparator 152-3 outputs a third comparison result at a logic "0" level. Therefore, when at least one of the first and second comparison results is at a logic "1" level, the first OR gate 154-1 outputs the first OR result at a logic "1" level. When both the first and second comparison results are at a logic "0" level, the second OR gate 154-1 outputs a first OR result at a logic "0" level. When the first OR result is at a logic "1" level, the third multiplexer 153-3 selects the current third loop counter value LCNT_C as the third update value. When the third comparison result is at a logic "1" level, the third multiplexer 153-3 selects the third additional value as the third update value. Otherwise, i.e., when both the first OR result and the third comparison result are at a logic "0" level, the third multiplexer 153-3 outputs zero as the third update value. In other words, when all the first to third comparison results are at a logic "0" level, the third multiplexer 153-3 outputs zero as the third update value.

When at least one of the first to third comparison results is at a logic "1" level, the second OR gate 154-2 outputs a second OR result at a logic "1" level. When all the first to third comparison results are at a logic "0" level, the second OR gate 154-2 outputs a second OR result at a logic "0" level. Therefore, the second OR gate 154-2 sends, to the control unit 110, the second OR result at a logic "0" level as the loop end signal $S_{LE}$ indicating an end of a loop.

The loop control unit 150 and the loop counter group 140 operate only when a valid signal $S_E$ arrives from the control unit 110. Specifically, only when receiving the valid signal $S_E$, the loop control unit 150 updates, to the first to third update values, the first to third loop counter values LCNT_A to LCNT_C of the first to third loop counters 141-1 to 141-3 of the loop counter group 140, respectively.

The loop control unit 150 controls the first multiplexer 153-1 in such a way as to select the first additional value output from the first adder 151-1 when LCNT_A<LMAX_A, and select zero otherwise, as the first update value of the first loop counter value LCNT_A stored by the first loop counter 141-1 equivalent to a first layer of a loop.

The loop control unit 150 controls the second multiplexer 153-2 in such a way as to select the current second loop counter value LCNT_B when LCNT_A<LMAX_A, select the second additional value output from the second adder 151-2 when LCNT_B<LMAX_B, and select zero otherwise, as the second update value of the second loop counter value LCNT_B stored by the second loop counter 141-2 equivalent to a second layer of a loop.

The loop control unit 150 controls the third multiplexer 153-3 in such a way as to select the current third loop counter value LCNT_C when LCNT_A<LMAX_A or LCNT_B<LMAX_B, select the third additional value output from the third adder 151-3 when LCNT_C<LMAX_C, and select zero otherwise, as the third update value of the third loop counter value LCNT_C stored by the third loop counter 141-3 equivalent to a third layer of a loop.

A combination of the loop control unit 150 and the loop counter group 140 is called a loop control device.

Figure 3:
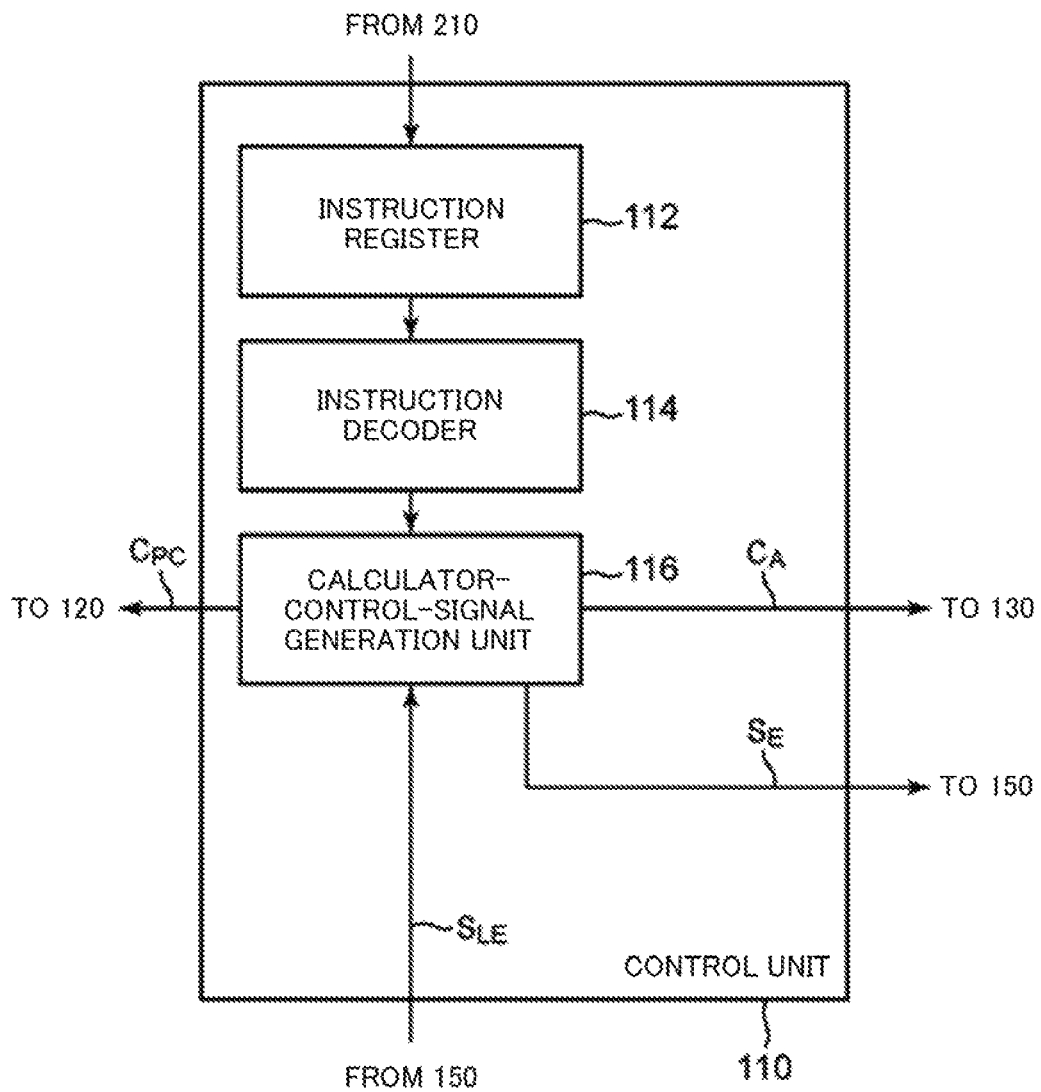
FIG. 3 is a block diagram illustrating a configuration of a control unit used in the data processing device illustrated in FIG. 1.

FIG. 3 is a block diagram illustrating a configuration of the control unit 110. The control unit 110 includes an instruction register 112, an instruction decoder 114, and a calculator-control-signal generation unit 116.

As well known in this technical field, an operation of the data processing device 100 of stored-program concept (a so-called von Neumann type) includes the following three cycles: an instruction fetch cycle, an instruction decode cycle, and an instruction execution cycle.

In the instruction fetch cycle, an instruction word to be executed next is read from the instruction memory 210, and stored in the instruction register 112.

In the instruction decode cycle, the instruction decoder 114 decodes an instruction word in the instruction register 112, and outputs a decode result. The decode result includes information such as a kind of instruction word, a kind of operand to be needed, and a storage place of a calculation result.

In the instruction execution cycle, the calculator-control-signal generation unit 116 accesses, in accordance with a decode result and a loop end signal, data to be needed, supplies a calculator control signal $C_A$ to the calculator 130, and stores a result thereof in an appropriate place. The calculator-control-signal generation unit 116 also supplies a program-counter control signal $C_{PC}$ to the program counter 120.

Thus, the control unit 110 controls the loop counter group 140 and the loop control unit 150, based on an instruction word taken from the instruction memory 210 and the loop end signal $S_{LE}$, and generates the calculator control signal $C_A$ and the program-counter control signal $C_{PC}$.

The calculator 130 executes, based on the calculator control signal $C_A$, a calculation on data stored in the data memory 220. The calculator 130 may be, for example, an arithmetic-and-logic unit (ALU).

The program counter 120 performs a count operation in response to the program-counter control signal $C_{PC}$, and stores an address of the instruction memory 210 storing an instruction word to be executed next.

Figure 4A:
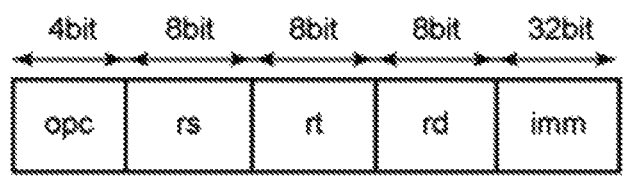
FIG. 4A is a diagram illustrating a configuration of an instruction word used in the data processing device illustrated in FIG. 1.

FIGS. 4A and 4B are diagrams illustrating a configuration of an instruction word used in the data processing device 100, and an operation thereof.

A configuration of an instruction word of the data processing device 100 is illustrated in FIG. 4A. Although it is illustrated herein that an instruction word includes a 4-bit operation code opc, first to third operands rs, rt, and rd each being 8-bit, and a 32-bit immediate field imm, the present example embodiment is not limited thereto. The first and second operands rs and rt are also called first and second input operands, respectively, and the third operand rd is also called a result operand.

An operation of an instruction word is illustrated in FIG. 4B. Although eight instruction words are illustrated herein, the present example embodiment may include other instruction words.

An NOP instruction is an idle instruction.

An ADD instruction is an addition instruction to add registers, within a register file RF that is not illustrated in FIG. 1, indicated by the first input operand rs and the second input operand rt, and write a result in a register within the register file RF indicated by the result operand rd.

An MVI instruction is an immediate assignment instruction to write a value of the immediate field imm into a register within the register file RF indicated by the result operand rd.

An SETLP instruction is an instruction to write a value of the immediate field imm into a register within the loop counter group 140 indicated by the result operand rd, or into a counter. For example, the following associations are conceivable.

rd==0:LCNT_A
rd==1:LCNT_B
rd==2:LCNT_C
rd==4:LMAX_A
rd==5:LMAX_B
rd==6:LMAX_C
rd==8:LSTEP_A
rd==9:LSTEP_B
rd==10:LSTEP_C

An MAC instruction is a sum-of-products instruction. This MAC instruction performs an operation of writing, for first to third data described later, back into a memory by adding a product of the first data and the second data to the third data. The first data are data indicated by a first memory address where a value acquired by multiplying the first loop counter value LCNT_A and the third loop counter value LCNT_C by a sum of LMAX_A+LSTEP_A is added, as an offset, to a base address indicated by the first operand rs. The second data are data indicated by a second memory address where a value acquired by multiplying the second loop counter value LCNT_B and the first loop counter value LCNT_A by a sum of LMAX_B+LSTEP_B is added, as an offset, to a base address indicated by the second operand rt. The third data are data indicated by a third memory address where a value acquired by multiplying the second loop counter value LCNT_B and the third loop counter value LCNT_C by a sum of LMAX_B+LSTEP_B is added, as an offset, to a base address indicated by the third operand rd.

A CMP instruction is an instruction to perform a subtraction of the registers within the register file RF indicated by the first input operand rs and the second input operand rt, and store, in a flag register FG that is not illustrated in FIG. 1, an arithmetic flag (a zero flag, a sign flag, or the like, but not limited thereto) acquired as a result.

A BRLT instruction is a branch instruction to check a value of a sign flag within the flag register FG, and add a value of the immediate field imm to a program counter value PC of the program counter 120 when the value of a sign flag is 1, i.e., subtraction result of an immediately preceding CMP instruction is a negative number (RF[rs]<RF[rt]). For example, when a value of the immediate field imm is −3, the control unit 110 receiving a BRLT instruction updates the program counter 120 with a program counter value of the instruction from which 3 is subtracted. Specifically, this branches to three instructions before.

A BRNEST instruction is a multi-loop-adaptive branch instruction to add a value of the immediate field imm to the program counter value PC when and only when the first to third loop counter values LCNT_A to LCNT_C are smaller than the first to third loop-count maximum values LMAX_A to LMAX_C, respectively. Specifically, the BRNEST instruction is a branch instruction to perform no branch only when the first to third loop counter values LCNT_A to LCNT_C are equal to the first to third loop-count maximum values LMAX_A to LMAX_C, respectively. This indicates a condition for escaping from a triple multi-loop. When a condition for escaping from a triple multi-loop is not fulfilled, the control unit 110 receiving a BRNEST instruction executes a jump to a top of a loop indicated by a value of the immediate field imm. In this case, the control unit 110 receiving the BRNEST instruction also updates the first to third loop counter values LCNT_A to LCNT_C. In other words, the control unit 110 sends the aforementioned valid signal $S_E$ to the loop control unit 150.

[Description of Operation]

FIG. 5 is a diagram illustrating an assembly program example when a matrix product is executed by use of the data processing device 100. Herein, a case where a first layer (innermost loop) is iterated 4 times, a loop on a second layer is iterated 2 times, and a third layer (outermost loop) is iterated 2 times is illustrated by way of example.

In FIG. 5, in first to third lines, the first to third loop-count-maximum-value registers 142-1 to 142-3 are set to loop-count maximum values 3, 1, and 1 as the first to third loop-count maximum values LMAX_A to LMAX_C by use of an SETLP instruction, respectively. In fourth to sixth lines, the first to third loop counters 141-1 to 141-3 are set to zero as the first to third loop counter values LCNT_A to LCNT_C by use of an SETLP instruction. In seventh to ninth lines, the first to third loop step registers 143-1 to 143-3 are set to 1 as the first to third loop-variable increment values LSTEP_A to LSTEP_C by use of an SETLP instruction.

FIG. 6 is a diagram illustrating an example of transition of the first to third loop counter values LCNT_A to LCNT_C stored in the first to third loop counters 141-1 to 141-3. #Iteration in a first column of a table in FIG. 6 represents an iteration number.

At iteration numbers 1 to 4, the first loop counter value LCNT_A associated with the innermost loop increases by the first loop-variable increment value LSTEP_A=1, as 0, 1, 2, and 3. In these cases, branching is performed to an address of a label specified by the first operand rs of a BRNEST instruction.

Herein, since LCNT_A=LMAX_A, the first loop counter value LCNT_A becomes zero at an iteration number 5. Since LCNT_B<LMAX_B, the second loop counter value LCNT_B increases by the second loop-variable increment value LSTEP_B=1, and becomes LCNT_B=1. In this case as well, branching is performed to an address of a label specified by the first operand rs of a BRNEST instruction.

At iteration numbers 6 to 8, the first loop counter value LCNT_A increases by the first loop-variable increment value LSTEP_A. In these cases as well, branching is performed to an address of a label specified by the first operand rs of a BRNEST instruction.

Herein, since LCNT_A=LMAX_A again, the first loop counter value LCNT_A becomes zero at the iteration number 9. Since LCNT_B=LMAX_B, the second loop counter value LCNT_B also becomes zero at the iteration number 9. Moreover, since LCNT_C<LMAX_C, the third loop counter value LCNT_C increases by the third loop-variable increment value LSTEP_C=1, and becomes LCNT_C=1. In this case as well, branching is performed to an address of a label specified by the first operand rs of a BRNEST instruction.

At iteration numbers 10 to 16, transition is also performed similarly. In these cases as well, branching is performed to an address of a label specified by the first operand rs of a BRNEST instruction.

At a point of the iteration number 16, LCNT_A=LMAX_A, LCNT_B=LMAX_B, and LCNT_C=LMAX_C. Accordingly, the first loop counter value LCNT_A, the second loop counter value LCNT_B, and the third loop counter value LCNT_C become zero as well. In this case, branching is not performed, and execution of the multi-loop is ended.

As above, by using the data processing device 100, it is possible to considerably reduce loop control instructions in a multi-loop, i.e., reduce execution time.

Next, a scheme of reducing address update instructions by use of the loop counter group 140 is described.

Figures 7, 8:
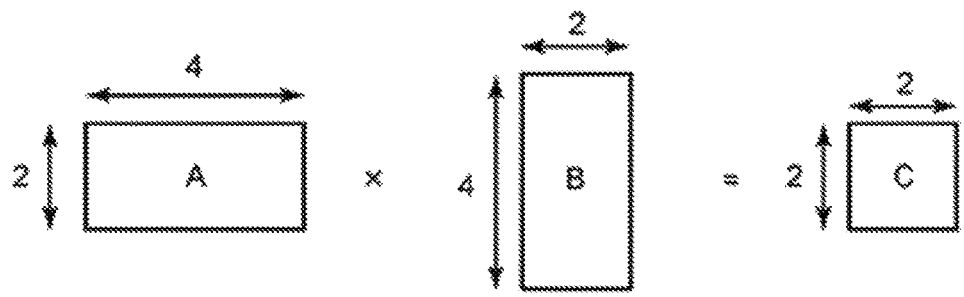
FIG. 7 is a diagram illustrating a calculation example of a matrix product.
FIG. 8 is a diagram illustrating, by way of example, a case where a matrix C having 2 rows and 2 columns is derived by multiplying a matrix A having 2 rows and 4 columns by a matrix B having 4 rows and 2 columns.

FIG. 7 is a diagram illustrating a calculation example of a matrix product. Herein, a case as illustrated in FIG. 8 where a matrix C having 2 rows and 2 columns is derived by multiplying a matrix A having 2 rows and 4 columns by a matrix B having 4 rows and 2 columns illustrated by way of example. It is assumed that the matrix A, the matrix B, and the matrix C are each stored in the following area of a memory. Specifically, the matrix A is stored in an area for 2×4=8 words starting from an address 0×00 of the memory. The matrix B is stored in an area for 4×2=8 words starting from an address 0×20 of the memory. The matrix C is stored in an area for 2×2=4 words starting from an address 0×40 of the memory. It is assumed that the matrix C is initialized with zero.

At the iteration number 1 in FIG. 7, all the first to third loop counter values LCNT_A to LCNT_C are zero. Thus, calculation of m[0×40+0+0*2]+=m[0×0+0+0*4]*m[0×20+0+0*2], i.e., a product of data at the address 0×00 and data at the address 0×20 is added to the address 0×40. This is equivalent to addition of a product of an element (0, 0) of the matrix A and an element (0, 0) of the matrix B to an element (0, 0) of the matrix C (note, however, that an element (X, Y) is assumed to represent an element having an X row and a Y column).

At the iteration number 2, the first loop counter value LCNT_A becomes 1. Thus, calculation of m[0×40+0+0*2]+=m[0×0+1+0*4]*m[0×20+0+1*2], i.e., a product of data at the address 0×01 and data at the address 0×22 is added to the address 0×40. This is equivalent to addition of a product of an element (0, 0) of the matrix A and an element (1, 0) of the matrix B to an element (0, 0) of the matrix C.

By executing the iteration numbers 3 and 4 similarly as well, A(0, 0)*B(0, 0)+A(0, 1)*B(1, 0)+A(0, 2)*B(2, 0)+A(0, 3)*B(3, 0) is stored in the element (0, 0) of the matrix C at an end point of the iteration number 4.

At the iteration number 5, calculation of m[0×40+1+0*2]+=m[0×0+0+0*4]*m[0×20+1+0*2], i.e., a product of data at the address 0×00 and data at the address 0×21 is added to the address 0×41. This is equivalent to addition of a product of an element (0, 0) of the matrix A and an element (0, 1) of the matrix B to an element (0, 1) of the matrix C.

At the iteration number 6, calculation of m[0×40+1+0*2]+=m[0×0+1+0*4]*m[0×20+1+1*2], i.e., a product of data at the address 0×01 and data at the address 0×23 is added to the address 0×41. This is equivalent to addition of a product of an element (0, 1) of the matrix A and an element (1, 1) of the matrix B to an element (0, 1) of the matrix C.

By executing the iteration numbers 5 to 9 similarly, A(0, 0)*B(0, 1)+A(0, 1)*B(1, 1)+A(0, 2)*B(2, 1)+A(0, 3)*B(3, 1) is stored in the element (0, 1) of the matrix C at an end point of the iteration number 9.

Similarly, by executing the iteration numbers 10 to 12, A(1, 0)*B(0, 0)+A(1, 1)*B(1, 0)+A(1, 2)*B(2, 0)+A(1, 3)*B(3, 0) is stored in the element (1, 0) of the matrix C at an end point of the iteration number 12.

Furthermore, by executing the iteration numbers 13 to 16, A(1, 0)*B(0, 1)+A(1, 1)*B(1, 1)+A(1, 2)*B(2, 1)+A(1, 3)*B(3, 1) is stored in the element (1, 1) of the matrix C at an end point of the iteration number 16.

Description of Advantageous Effect

As a consequence, the data processing device 100 can execute a calculation of a matrix product, after completely removing address update instructions.

Second Example Embodiment

As compared with the first example embodiment described above, a second example embodiment in the present invention is different in that a BRNEST instruction is integrated with an MAC instruction, but is similar in other respects.

Figures 9A, 9B:
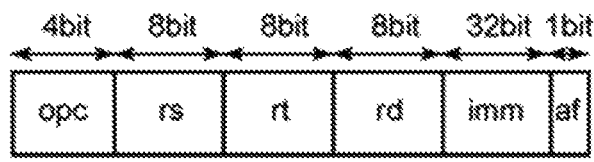
FIG. 9A is a diagram illustrating a configuration of an instruction word used in a data processing device according to a second example embodiment of the present invention.
FIG. 9B is a diagram illustrating an operation of an MAC instruction used in the data processing device according to the second example embodiment of the present invention.

FIGS. 9A and 9B are diagrams illustrating a configuration of an instruction word and an operation of an MAC instruction in the second example embodiment. According to this, as illustrated in FIG. 9A, a 1-bit field af is added to an instruction word in the second example embodiment. Further, as illustrated in FIG. 9B, an MAC instruction is configured in such a way that, in addition to an operation in the first example embodiment, an operation of a BRNEST instruction is performed when a value of the field af is 1.

FIG. 10 is a diagram illustrating an assembly program example when a matrix product in the second example embodiment is executed.

Herein, in addition to three operands rs, rr, and rd, an operand representing an immediate field imm, and an operand representing the field af are added to an MAC instruction. Specifically, in an instruction on 10th line in FIG. 10, a value of the field af is 1, and a program counter increment value (0) to a label LX is stored as a value of the immediate field imm.

As a consequence, it is possible to execute a calculation of a matrix product after completely removing loop control instructions as well as address update instructions, and achieve considerable reduction of execution time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2017-218089, filed on Nov. 13, 2017, the disclosure of which is incorporated herein in its entirety by reference.

INDUSTRIAL APPLICABILITY

The present invention is applicable to such a purpose as achievement of high speed in an application using many matrix product calculations, including machine learning, signal processing, or the like.

REFERENCE SIGNS LIST

100 Data processing device
110 Control unit
112 Instruction register
114 Instruction decoder
116 Calculator-control-signal generation unit
120 Program counter
130 Calculator
140 Loop counter group
141-1, 141-2, 141-3 Loop counter
142-1, 142-2, 142-3 Loop-count-maximum-value register
143-1, 143-2, 143-3 Loop step register (loop-variable-increment register)
150 Loop control unit
151-1 to 151-3 Adder
152-1 to 152-3 Comparator
153-1 to 153-3 Multiplexer
154-1, 154-2 OR gate
210 Instruction memory
220 Data memory
LCNT_A to LCNT_C Loop counter value
LMAX_A to LMAX_C Loop-count maximum value
LSTEP_A to LSTEP_C Loop-variable increment value

What is claimed is:

1. A data processing device comprising:
a loop counter group that includes a loop-control register set;
a loop controller that controls the loop counter group, based on a value of the loop counter group, and generates a loop end signal;
a controller that controls the loop counter group and the loop controller, based on an instruction word taken from an instruction memory and the loop end signal, and generates a calculator control signal and a program-counter control signal;
a calculator that executes a calculation, based on the calculator control signal; and
a program counter that performs a count operation in response to the program-counter control signal, and stores an address of the instruction memory storing an instruction word to be executed next, wherein
the loop counter group includes, for first to N-th (N is an integer of 2 or more) layers of a multi-loop, as the loop-control register set, first to N-th loop counters, first to N-th loop-count-maximum-value registers, and first to N-th loop-variable-increment registers,
the loop controller performs determination of a loop end by comparing an n-th (1≤n≤N) loop counter value of an n-th loop counter within the loop-control register set with an n-th loop-count maximum value of an n-th loop-count-maximum-value register in such a way as to perform loop control of the multi-loop, performs zero reset of the n-th loop counter in a case of a loop end, and, in a case of not being a loop end, causes the n-th loop counter to store, as an n-th update value being a new n-th loop counter value, an n-th additional value acquired by adding an n-th loop-variable increment value of an n-th loop-variable-increment register to the n-th loop counter value,
the loop controller simultaneously performs loop end determination and loop counter update for the first to N-th loop counters being associated with the first to N-th layers, respectively, and
the controller generates the calculator control signal associated with the multi-loop by causing each of first to N-th counter values of the first to N-th loop counters to act on an associated field of the instruction word, and then outputs the calculator control signal to the calculator.

2. The data processing device according to claim 1, wherein
the loop controller includes
an n-th adder that outputs the n-th additional value by adding the n-th loop counter value and the n-th loop-variable increment value,
an n-th comparator that outputs an n-th comparison result by comparing the n-th loop counter value with the n-th loop-count maximum value,
an n-th multiplexer that selects, based on the first to n-th comparison results, one of the n-th loop counter value, the n-th additional value, and zero, and then supplies a selected value to the n-th loop counter as the n-th update value, and
an OR gate group that derives an OR of the first to n-th comparison results, and outputs at least the loop end signal.

3. The data processing device according to claim 2, wherein
the controller outputs a valid signal when a condition for escaping from the multi-loop is not fulfilled, and the loop controller updates, in response to the valid signal, the first to N-th loop counters within the loop counter group, with first to N-th update values, respectively.

4. A data processing method,
in a data processing device including
a loop counter group that includes a loop-control register set,
loop a loop controller that controls the loop counter group, based on a value of the loop counter group, and generates a loop end signal,
a controller that controls the loop counter group and the loop controller, based on an instruction word taken from an instruction memory and the loop end signal, and generates a calculator control signal and a program-counter control signal,
a calculator that executes a calculation, based on the calculator control signal, and
a program counter that performs a count operation in response to the program-counter control signal, and stores an address of the instruction memory storing an instruction word to be executed next,
the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the data processing method comprising:
by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, performing zero reset of the n-th loop counter in a case of a loop end, and, in a case of not being a loop end, causing the n-th loop counter to store, as an n-th update value being a new n-th loop counter value, an n-th additional value acquired by adding an n-th loop-variable increment value of an n-th loop-variable-increment register to the n-th loop counter value;
by the loop controller, simultaneously performing loop end determination and loop counter update for the first to N-th loop counters being associated with the first to N-th layers, respectively; and
by the controller, generating the calculator control signal associated with the multi-loop by causing each of first to N-th counter values of the first to N-th loop counters to act on an associated field of the instruction word, and then outputting the calculator control signal to the calculator.

5. A non-transitory computer-readable recording medium embodying a program, the program causing a data processing device to perform a method,
in the data processing device including
a loop counter group that includes a loop-control register set,
a loop controller that controls the loop counter group, based on a value of the loop counter group, and generates a loop end signal,
a controller that controls the loop counter group and the loop controller, based on an instruction word taken from an instruction memory and the loop end signal, and generates a calculator control signal and a program-counter control signal,
a calculator that executes a calculation, based on the calculator control signal, and
a program counter that performs a count operation in response to the program-counter control signal, and stores an address of the instruction memory storing an instruction word to be executed next,
the loop counter group including, for first to N-th (N is an integer of 2 or more) layers of a multi-loop, as the loop-control register set, first to N-th loop counters, first to N-th loop-count-maximum-value registers, and first to N-th loop-variable-increment registers, the method comprising:
by the loop controller, performing determination of a loop end by comparing an n-th ($1 \leq n \leq N$) loop counter value of an n-th loop counter within the loop-control register set with an n-th loop-count maximum value of an n-th loop-count-maximum-value register in such a way as to perform loop control of the multi-loop, processing of performing zero reset of the n-th loop counter in a case of a loop end, and processing of, in a case of not being a loop end, causing the n-th loop counter to store, as an n-th update value being a new n-th loop counter value, an n-th additional value acquired by adding an n-th loop-variable increment value of an n-th loop-variable-increment register to the n-th loop counter value;
by the loop controller, simultaneously performing loop end determination and loop counter update for the first to N-th loop counters being associated with the first to N-th layers, respectively; and
by the controller, generating the calculator control signal associated with the multi-loop by causing each of first to N-th counter values of the first to N-th loop counters to act on an associated field of the instruction word, and then outputting the calculator control signal to the calculator.

* * * * *